United States Patent [19]

Koek et al.

[11] Patent Number: 4,715,682

[45] Date of Patent: Dec. 29, 1987

[54] MOUNT FOR IMAGING LENS ARRAY ON OPTICAL PRINT HEAD

[75] Inventors: Kevin C. Koek; William T. Matthias, both of Rochester; James T. Barton, Fairport, all of N.Y.

[73] Assignee: Eastman Kodak Company, Rochester, N.Y.

[21] Appl. No.: 884,943

[22] Filed: Jul. 11, 1986

[51] Int. Cl.$^4$ .......................... G02B 7/02; G02B 6/04
[52] U.S. Cl. .......................... 350/253; 350/96.25; 355/1
[58] Field of Search ...................... 350/252, 253, 96.25, 350/96.27, 96.28, 96.31; 355/1

[56] References Cited

U.S. PATENT DOCUMENTS

| | | | |
|---|---|---|---|
| 3,658,407 | 4/1972 | Kitano et al. | 350/96.25 |
| 4,147,412 | 4/1979 | Kawamura et al. | 350/252 |
| 4,653,894 | 3/1987 | Pease | 355/1 |

Primary Examiner—Bruce Y. Arnold
Assistant Examiner—Loha Ben
Attorney, Agent, or Firm—Milton S. Sales

[57] ABSTRACT

Apparatus is disclosed for mounting an imaging lens array formed of a plurality of gradient index optical fibers onto a print head having a linear array of light sources, such that the optical fibers are accurately spaced from and aligned with the light sources. The apparatus includes attachment means for totally constraining one end of the imaging lens array relative to the print head and for constraining the other end of the imaging lens array to inhibit movement of the lens in two directions, while permitting at least limited relative movement between the imaging lens and the print head in a direction along the length of the light source array to accommodate different rates of thermal expansion of the imaging lens array and of the print head.

5 Claims, 8 Drawing Figures

U.S. Patent  Dec. 29, 1987  Sheet 1 of 4  4,715,682
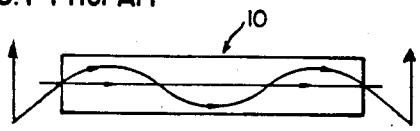
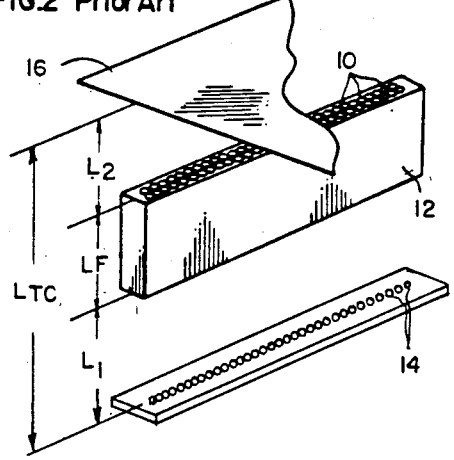

MOUNT FOR IMAGING LENS ARRAY ON OPTICAL PRINT HEAD

BACKGROUND OF THE INVENTION

1. Field of the Invention

The present invention relates to optical print heads and to means for transmitting light emitted from the print heads to a photosensitive surface, and more particularly to means for accurately aligning the transmitting means and the print head to maintain high resolution and good exposure uniformity.

2. Description of the Prior Art

High speed optical printing devices used in data processing systems are intended for converting electric input signals into printed form, and include photosensitive means and light sources such as linear arrays of light emitting diodes (LED's), photodiodes, or similar devices. Light from a source is often transmitted to the photosensitive means via a plurality of gradient index optical fibers forming an imaging lens array. Such imaging lens arrays are commercially available as SELFOC (a trademark of Nippon Sheet Glass Co., Ltd.) lenses in a staggered two-row bundle of optical fibers as described in U.S. Pat. No. 3,658,407, patented on Apr. 25, 1972. Reference may be made to that patent for details of the lens arrays.

A gradient index optical fiber 10 is illustrated in FIG. 1. The refractive index distribution of the optical fiber varies parabolically outwards from the longitudinal axis of the optical fiber towards the peripheral portion thereof.

FIG. 2 shows an imaging lens array 12 formed of a staggered, two-row bundle of optical fibers 10. If the distances $L_1$ and $L_2$ are properly selected and equal, then there is obtained an erect image at a magnification of one of an object. Distance $L_{TC}$ represents the total conjugate of the lens (i.e., the distance between the object and image planes). Accordingly:

$L_1 = L_2$, and $L_{TC} = L_F + L_1 + L_2$

Where $L_F$ is the length of optical fibers 10 of imaging lens array 12.

Imaging lens arrays such as shown in FIG. 2 have been proposed for transmitting light between an array of LED's 14 and photosensitive means such as a photoconductive member 16. For optimum resolution, dimensions $L_{TC}$, $L_1$, and $L_2$ must be accurately set and maintained. In the design of prior art devices such as shown in U.S. Pat. No. 4,147,412, it is assumed that the total conjugate $L_{TC}$ does not vary from lens to lens and that, as such, the spacing between the object plane and the image plane can be fixed at the total conjugate distance. While this approximation is adequate for low resolution applications, in fact however, the lens parameters $L_{TC}$ and $L_F$ vary considerably between manufacturers, and even between lenses of the same manufacturer.

LED's generate a considerable amount of heat during operation, and the heat is absorbed by both the print head and the lens array, which commonly have different rates of thermal expansion. Rigid mounts for the lens array on the print head result in excessive stress due to the different expansion rates.

It is, therefore, an object of the present invention to provide a mount for locating an imaging lens on a print head in a way which allows for convenient and accurate compensation for variations in lens array dimensions, while accommodating the different rates of thermal expansion of the imaging lens array and the print head.

SUMMARY OF THE INVENTION

In accordance with the present invention, apparatus is provided for mounting an imaging lens array formed of a plurality of gradient index optical fibers onto a print head having a linear array of light sources, such that the optical fibers are accurately spaced from the light sources in a first direction along their optical axes and are accurately positioned in a second direction lateral to the length of the light source array so as to align with the light sources.

The apparatus includes attachment means for totally constraining one end of the imaging lens array relative to the print head and for constraining the other end of the imaging lens array to inhibit movement of the lens array in the first and second directions while permitting at least limited relative movement between that end of the imaging lens array and the print head in a third direction along the length of the light source array to accommodate different rates of thermal expansion of the imaging lens array and of the print head.

In a preferred embodiment, the imaging lens array is attached to a stiffener. Attaching the ends of the stiffener to interface blocks provides a movable interface between the print head and the lens array for compensation of component variation in the first and second directions. After optimization of each component relative to one another, all interface surfaces are locked together in a manner which permits relative movement for thermal expansion differences without affecting alignments critical to the maintenance of resolution and good exposure uniformity.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings in which:

FIG. 1 is a representation of an optical fiber in accordance with the prior art and wherein the geometry of the fiber is illustrated;

FIG. 2 is a perspective view of an imaging lens array formed by a staggered, two-row bundle of optical fibers as shown in FIG. 1, and also shows a print head with an LED array at the object plane and photosensitive means at the image plane;

DETAILED DESCRIPTION OF THE PREFERRED EMBODIMENT

The present description will be directed in particular to elements forming part of, or cooperating more directly with, apparatus in accordance with the present invention. It is to be understood that elements, components, and/or sub-components not specifically shown or described may take various forms well known to those skilled in the art.

To assist in understanding the present invention, an electrophotographic copier/printer in which the invention may be used will be briefly described. It will be understood, however, that the apparatus of the present invention can be used in other types of apparatus.

Figure 3:
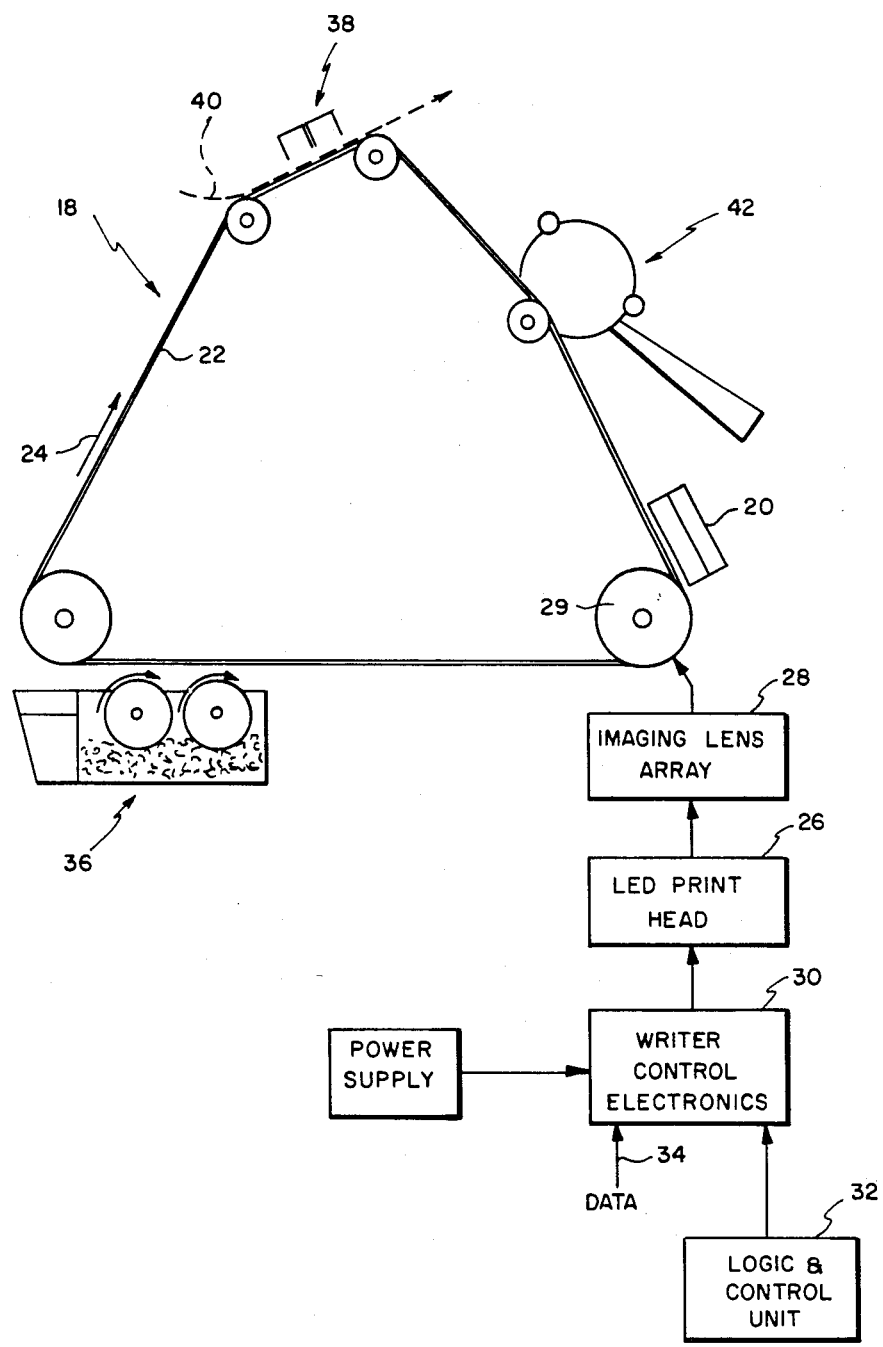
FIG. 3 is a schematic vertical section of an electrophotographic apparatus including the imaging lens array and print head of FIG. 2.

Referring to FIG. 3, electrophotographic apparatus generally designated 18 includes a charging station 20 for applying a uniform charge to photosensitive means such as a photoconductor 22. The photoconductor illustrated is an endless belt trained about a plurality of rollers and driven in the direction of an arrow 24. Light from selected LED's of a print head 26 is transmitted by an imaging lens array 28 onto the surface of photoconductor 22 as the photoconductor passes over a roller 29. The light striking the charged photoconductor selectively dissipates portions of the charge to form an electrostatic latent image on the photoconductor. The specific LED's of the print head which are activated at any given time are selected by means of writer control electronics 30, a logic and control unit 32, and the data entering along line 34.

A magnetic brush development station 36 transfers toner particles to the photoconductor for developing the latent image. The resulting toned image then travels to a transfer and detack station 38 where the image is transferred to a copy sheet fed from a supply, not shown, along path 40. After the photoconductor passes through transfer and detack, it is cleaned at station 42 and is available for another cycle of operation.

Figure 4:
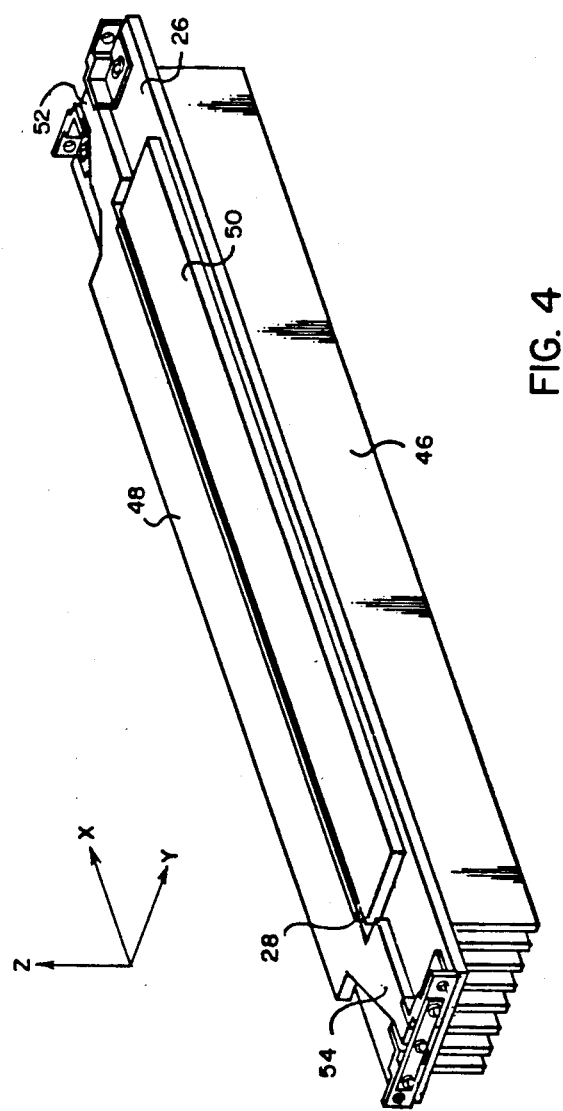
FIG. 4 is a perspective view of a print head and imaging lens array subassembly with mounting means in accordance with the present invention.

Referring to FIG. 4, a subassembly includes the print head 26 and imaging lens array 28, both of which are schematically shown in FIG. 3. The print head per se is a conventional, commercially-available unit with a linear array of LED's, a transparent faceplate covering the LED's, and heat-conducting cooling vanes 46. Imaging lens array 28 includes a staggered, two-row bundle of gradient index optical fibers disposed above the LED array of the print head. The ends of the optical fibers are accurately spaced in a Z-direction (along the optical axes of the fibers) from the LED's by a distance $L_1$ as shown in FIG. 2 as well as being accurately positioned in a Y-direction (lateral to the LED array) so as to align with the LED's along the length of the print head. The lens array is preferably longer than the LED array so that the position of the imaging lens array along the X-direction (along the length of the LED array) is not as critical.

Commercially available imaging lens arrays of the type discussed herein are somewhat flexible and tend to bend. It will be appreciated that very little bending would be needed to cause significant defocusing of the image of the LED's on the photoconductor. Accordingly, imaging lens array 28 has been bonded between two stiffeners 48 and 50. Stiffener 48 has a pair of arms 52 and 54 for attaching the stiffener (and thereby the imaging lens) to the print head.

Figures 5, 6:
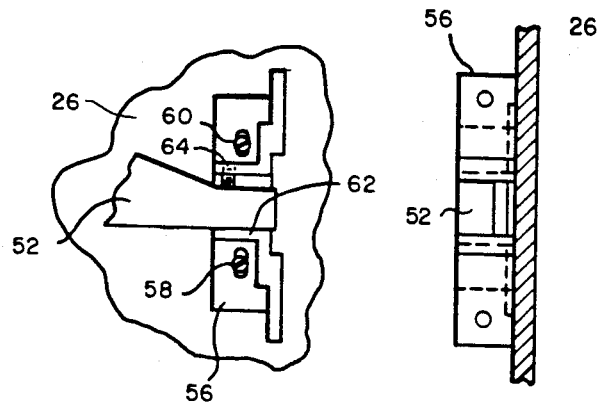
FIGS. 5 and 6 are top and side views, respectively, showing details of a portion of the mounting means.

Details of the attachment means for arm 52 are better seen in FIGS. 5 and 6. An interface block 56 is slidably mounted on print head 26 by a pair of screws 58 and 60 and elongated holes in the block through which the screws pass. After imaging lens array 28 has been properly aligned laterally with the LED array (the Y-direction of FIG. 4), block 56 is slid (the screws being loose) until an upstanding wing 62 abuts arm 52 of stiffener 48. Screws 58 and 60 are tightened, and a set screw 64 is tightened. When the imaging lens array is properly spaced from the LED array (the Z-direction in FIG. 4) by a distance $L_1$ of FIG. 2, a set screw 64 is tightened to totally constrain arm 52 relative to the print head.

Figures 7, 8:
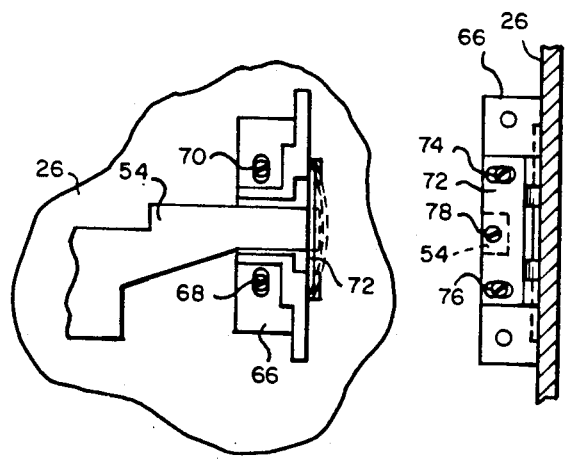
FIGS. 7 and 8 are top and side views, respectively, showing details of another portion of the mounting means.

The attachment means for arm 54 can be seen in FIGS. 7 and 8 (as well as FIG. 4). The coefficient of thermal expansion of the imaging lens array and stiffeners may differ from that of the print head, and must be accounted for in the design of the mounting means. The attachment of arm 54 is not the same as that of arm 52, and provides for such thermal expansion after imaging lens array 28 has been properly aligned with and spaced from the LED array as described above. Now final attachment of arm 54 can be effected. An interface block 66 is slidably mounted in the Y-direction on print head 26 by a pair of screws 68 and 70 which pass through respective elongated holes in block 66. A flexible steel plate 72 is mounted at its ends to block 66 by a pair of screws 74 and 76 which also pass through elongated holes to permit vertical (Z-direction) movement of the plate relative to the interface block.

During assembly, interface block 66 and plate 72 thereon are moved relative to arm 54 until a screw hole in the plate aligns with a predrilled and tapped hole in the end of arm 54. A screw 78 is inserted into the tapped hole and screws 68, 70, 74, 76 and 78 are tightened to secure the sub-assembly elements such that movement of imaging lens array 28 in directions along its optical axis (Z-direction) and lateral to the LED array (Y-direction) is inhibited, while thermal expansion and contraction of the imaging lens array and stiffeners along their lengths (X-direction) at a rate different from the thermal expansion and contraction of the print head are permitted.

The invention has been described in detail with particular reference to a preferred embodiment thereof, but it will be understood that variations and modifications can be effected within the spirit and scope of the invention.

We claim:

1. Apparatus for mounting an imaging lens array formed of a plurality of gradient index optical fibers onto a print head having a linear array of light sources, such that the optical fibers are accurately spaced from the light sources in a first direction along their optical axes and are accuretely positioned in a second direction lateral to the length of the light source array so as to align with the light sources; said apparatus comprising:
    first attachment means for totally constraining one end of the imaging lens array relative to the print head; and
    second attachment means for constraining the other end of the imaging lens array to inhibit movement of the lens array in the first and second directions while permitting at least limited relative movement between said other end of the imaging lens array and the print head in a third direction along the length of the light source array to accommodate different rates of thermal expansion of the imaging lens array and of the print head.

2. Apparatus as defined in claim 1 further comprising means attached to the imaging lens array for stiffening the lens array, said first and second attachment means attaching said stiffening means to the print head at respective positions spaced from each other along said third direction.

3. Apparatus as defined in claim 2 wherein said stiffening means comprises two plates bonded to respective lateral sides of the imaging lens array.

4. Apparatus as defined in claim 1 wherein said first and second attachment means comprise interface blocks adapted:

to be moved relative to the imaging lens array and to the print head after the imaging lens array has been positioned relative to the print heads; and to be thereafter secured to the imaging lens array and the print head for constraining the imaging lens array.

5. Apparatus as defined in claim 1 wherein said second attachment means comprises a flexible plate interconnecting the imaging lens array and the print head such as to flex upon relative expansion and contraction of the imaging lens array and the print head along said third direction.

* * * * *